Patented Dec. 19, 1922.

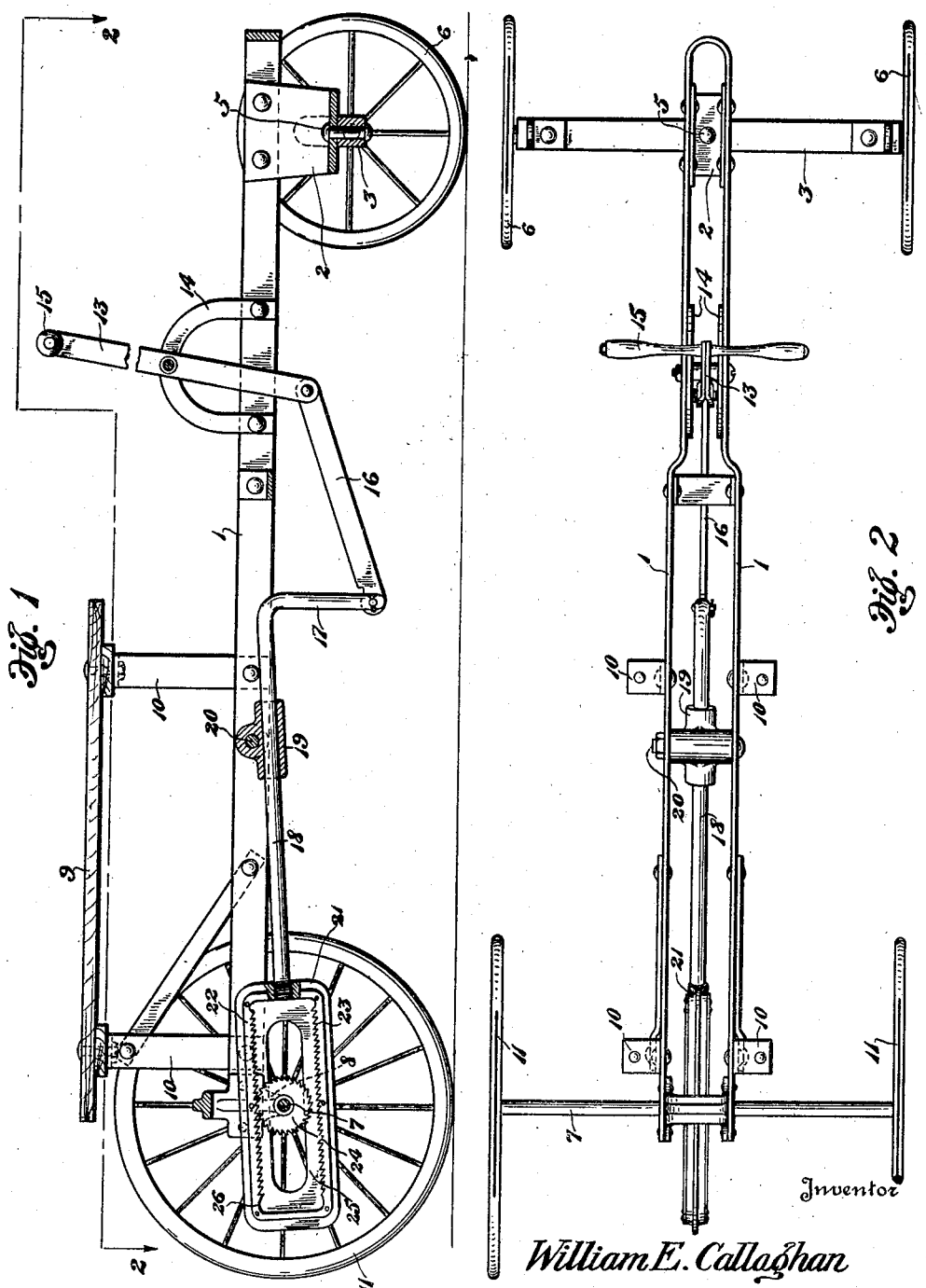

1,439,465

UNITED STATES PATENT OFFICE.

WILLIAM E. CALLAGHAN, OF CANTON, OHIO.

HAND-PROPELLED VEHICLE.

Application filed April 12, 1922. Serial No. 551,867.

*To all whom it may concern:*

Be it known that I, WILLIAM E. CALLAGHAN, a citizen of the United States, residing at Canton, in the county of Stark and State of Ohio, have invented a new and useful Hand-Propelled Vehicle, of which the following is a specification.

This invention relates to hand propelled vehicles and more particularly to means for manually driving toy wagons and the like.

The objects of the invention are to provide a hand propelled vehicle in which an oscillating movement of the operating lever is transformed into a continuous rotary motion of the driving axle.

The above and other objects may be attained by constructing the device as illustrated in the accompanying drawings, in which—

Figure 1 is a longitudinal section of a hand propelled vehicle embodying the invention; and Fig. 2, a plan section on the line 2—2, Fig. 1.

Similar numerals indicate similar parts throughout the drawing.

In the drawings a hand propelled vehicle is shown, comprising a suitable truck frame including the spaced, longitudinally disposed members 1, upon the forward end of which is mounted a bolster 2, to which the front axle 3 is pivoted as by the king bolt 5 in order that the front wheels 6, may be turned to guide the vehicle in either direction.

The rear driving axle 7, is journaled in suitable bearings 8, mounted upon the rear end portion of the truck frame. A seat 9 may be supported above the truck frame as by the brackets 10 which extend upward therefrom. The rear wheels 11 are fixed in a suitable manner upon the driving axle 7.

The operating lever 13 is pivotally mounted, intermediate its extremities, upon the truck frame as by the spaced, inverted U-shaped brackets 14, which are rigidly mounted upon the frame and extend upward therefrom. A suitable hand piece 15 may be provided upon the upper end of the lever for operating the same.

The lower end of the operating lever is pivotally connected, as by the link 16, with the depending end portion 17 of the L-shaped transmission rod 18 which is slidably mounted within the bearing 19, pivoted as at 20 to the frame.

A slide frame 21, of rectangular shape, is carried at the rear end of the transmission rod 18 and is provided with the upper and lower, oppositely disposed rack portions 22 and 23 respectively arranged to alternately engage the ratchet gear 24 which is fixed upon the driving axle 7.

Slotted guide plates 25 are mounted upon opposite sides of the slide frame enclosing the ratchet gear within said frame and assuring contact with either of the rack portions as the transmission rod is moved forward and backward through the operation of the operating lever.

The operation of the device will be obvious from the above description and the accompanying drawing. In the position shown in Fig. 1, the operating lever is being moved rearward as indicated by the arrow. It will be seen that this rearward movement of the operating lever will, through the link 16, pull forwardly upon the depending end 17 of the transmission rod, rocking the bearing 19 to hold the upper rack 22 in engagement with the ratchet gear as the slide frame 21 is moved forward by the forward movement of the transmission rod, thus rotating the driving axle 7 forward.

Upon reversing the movement of the operating lever, the bearing 19 will be rocked in the opposite direction, rocking the transmission rod upward to bring the lower rack 23 into engagement with the ratchet gear, continuing the forward rotation thereof as the slide frame is moved rearward.

As the operating lever is thus oscillated alternately backward and forward, the racks 22 and 23 will be alternately moved into engagement with the ratchet gear, continuously rotating said ratchet gear, and with it the driving axle, to propel the vehicle forward.

If it is desired to throw the driving mechanism into neutral position, the operating lever is moved rearwardly to the limit of its movement, bringing the racks entirely out of engagement with the ratchet gear, holding the blank portion 26 of the slide frame in engagement with the gear.

I claim:

1. A hand propelled vehicle including a traction wheel, a gear carried thereby, a pivoted bearing, a transmission rod slidably mounted through the bearing and provided with a depending forward end portion, a slide frame carried at the rear end of the transmission rod, and having spaced rack portions and an operating lever operatively connected to the depending portion of the transmission rod for reciprocating the transmission rod and rocking the bearing to alternately engage opposite sides of the gear with the rack portions.

2. A hand propelled vehicle including a traction wheel, a gear carried thereby, a pivoted bearing, a transmission rod slidably mounted through the bearing and provided with an angular forward end portion, a slide frame carried at the rear end of the transmission rod, and having spaced rack portions, an operating lever, and a link connecting the operating lever to the angular end of the transmission rod for reciprocating the transmission rod and rocking the bearing to alternately engage opposite sides of the gear with the rack portions.

WILLIAM E. CALLAGHAN.